United States Patent

Terrels et al.

[11] Patent Number: 5,175,911
[45] Date of Patent: Jan. 5, 1993

[54] SNAP FASTENER

[76] Inventors: Joseph L. Terrels, 111 S. Bolmar St., West Chester, Pa. 19382; Christopher J. Terrels, 1324 Central Ave., Ocean City, N.J. 08226

[21] Appl. No.: 792,383
[22] Filed: Nov. 15, 1991

Related U.S. Application Data

[63] Continuation-in-part of Ser. No. 498,925, Mar. 23, 1990.

[51] Int. Cl.$^5$ .................. A44B 17/00; F06B 13/00
[52] U.S. Cl. .................................... 24/674; 24/662; 411/44
[58] Field of Search .................. 24/674, 673, 671, 614, 24/662, 453, 106, 129 A, 129 R; 411/44, 57

[56] References Cited

U.S. PATENT DOCUMENTS

| | | | |
|---|---|---|---|
| 786,183 | 3/1905 | Bend | 24/673 |
| 1,678,240 | 7/1928 | Benz | 24/674 |
| 1,774,347 | 8/1930 | Bainton | 24/674 |
| 2,134,037 | 10/1938 | Fenton | 24/674 |
| 2,745,161 | 5/1956 | Van Buren, Jr. | 24/673 |
| 2,943,373 | 7/1960 | Rapata | 24/662 |
| 3,577,606 | 5/1971 | Tyrrell, Sr. | 24/129 R |
| 4,757,664 | 7/1988 | Freissle | 411/44 |
| 4,890,364 | 1/1990 | Tanaka et al. | 24/673 |
| 4,995,152 | 2/1991 | Steckler | 24/129 R |

FOREIGN PATENT DOCUMENTS

| | | | |
|---|---|---|---|
| 0787820 | 12/1957 | United Kingdom | 24/662 |
| 0855285 | 11/1960 | United Kingdom | 411/57 |

Primary Examiner—Victor N. Sakran
Attorney, Agent, or Firm—Dann, Dorfman, Herrell and Skillman

[57] ABSTRACT

A replacement fastener for use with a female snap member to provide a snap fastener. The male snap member is formed of an acetal resin which is tough and resilient and has its own self-lubricating properties. The male fastner has a flange with a button on one side adapted to engage in the socket of the female snap and has an anchor portion adapted to be firmly anchored in a boat structure in the precise location where the conventional male fastener was located.

6 Claims, 1 Drawing Sheet

SNAP FASTENER

RELATED APPLICATION

The present application is a continuation-in-part of our application, Ser. No. 07/498,925, filed Mar. 23, 1990.

FIELD OF THE INVENTION

The present invention relates to fasteners and has particular application to a snap fastener for use on boats, aircraft and land vehicles and in other installations which are subject to severe atmospheric conditions.

BACKGROUND OF THE INVENTION

Snap fasteners are commonly used on boats and vehicles for anchoring canvas covers to the vehicle body so that the canvas covers may be readily removed by simply pulling the cover, allowing the snap fastener to release the cover. Typically, the cover is provided with the female snap member which cooperates with the male snap member which is rigidly mounted on the body of the boat or other installation. When the cover is removed and stowed, the female snap member is protected from the elements, but the male snap member which is secured to the body of the boat is exposed to the elements and particularly in a marine environment is subject to deterioration. When the fasteners are new, the cover is easily removed and replaced, but when the male fastener deteriorates, the removal of the cover often pulls the male fastener out of the body, or the fastener becomes non-functional and must be drilled out. Replacing the male fastener is frequently difficult because of the inaccessibility of the body st in which the male fastener is inserted and, furthermore, when the male fastener is pulled out of the body or even when it is drilled out, the body may be damaged to a point where a conventional male fastener may not be remounted and be maintained secure.

SUMMARY OF THE INVENTION

The present invention provides a replacement male snap fastener which may be installed from the exposed surface of the body without requiring access to the undersurface.

Another object of the invention is to provide a replacement male snap fastener which cooperates with the conventional steel female fastener and which does not deteriorate under severe weather conditions nor does it tend to interlock with the steel female fastener so as to resist the normal removal and replacement of the cover on the structure through the use of the fasteners.

BRIEF DESCRIPTION OF THE DRAWINGS

All of the objects of the invention are more fully set forth hereinafter with reference to the accompanying drawings, wherein.

DESCRIPTION OF THE PREFERRED EMBODIMENT

Figure 1:
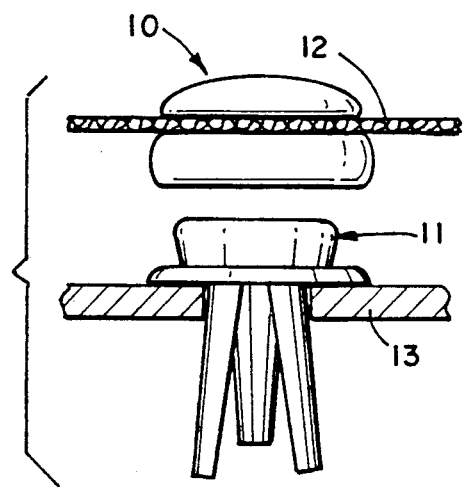
FIG. 1 is an exploded sectional view showing a female snap fastener anchored to a cover element and cooperable with a male snap fastener element, all in accordance with the present invention.

Referring now to the drawings, the present invention includes a female snap member 10 in combination with a male snap member 1. As shown, the female snap member is mounted in a canvas cover 12 and the male snap member 11 is mounted in a base 13, for example the gunwale of a boat. The structure 13 is normally relatively fixed whereas the cover 12 is designed to be moved into place on the structure 13 and to be removed from the structure 13.

The female snap member 10 includes a dome-like top 15 which engages the canvas cover element 12 between the dome 15 and underlying socket element 16. The socket element 16 comprises a cup-shaped shell 17 having an inturned flange along its undersurface at 18 to receive a circular spring element 19 within the socket formed above the flange 18 The spring element 19 is split at 20 to afford radial expansion and contraction of the circular spring element 19 as it engages and disengages the male member 11 of the combination.

The male fastener 11 is a two-part member comprising an anchor member 22 and a wedge member 23. The anchor member 22 has a medial flange 24 with an upstanding button 25 having an outwardly-flared wall 26. The button 25 is designed to fit through the opening formed by the inturned flange 18 of the female element 10 so that the flared wall engages the spring element 19. The outer diameter of the flared wall is larger than the normal internal diameter of the spring, whereas the smaller diameter of the flared wall is equal to or less than the normal contracted internal diameter of the ring member 19. The ring member 19 is adapted to engage the flared wall 26 as the snap member is positioned over the button 25, and the rounded upper part of the flared wall 26 expands the spring 19 so as to allow the button to pass through the spring and the spring ring 19 to engage the flared wall below the upper edge. The button 25 has a hollow interior 27 through which the wedge member 23 passes during installation of the male member into the opening 14 in the structure 13.

Figure 2:
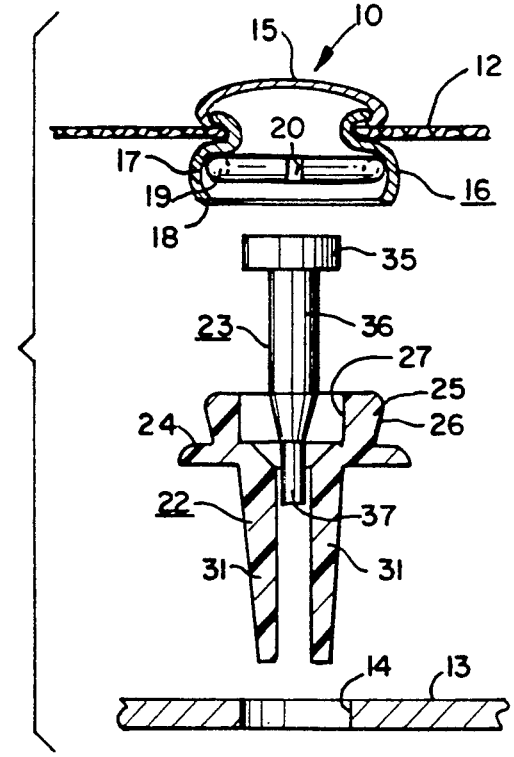
FIG. 2 is an exploded sectional view showing the elements of FIG. 1 separated.
Figure 3:
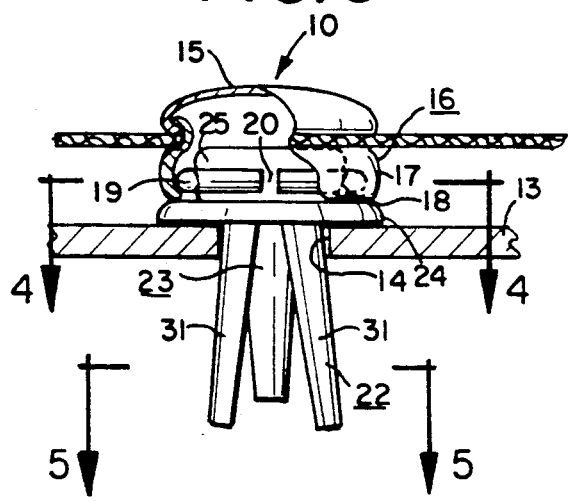
FIG. 3 is a view with portions broken away showing the elements in place after installation and securing of the cover to a boat structure.
Figure 4:
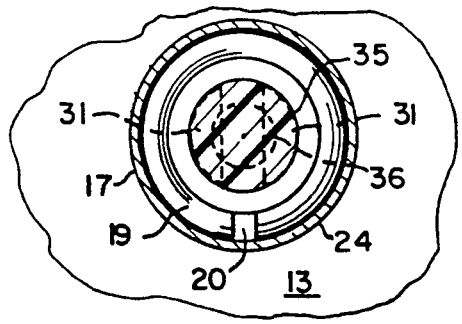
FIGS. 4 and 5 are sectional views taken on the lines 4—4 and 5—5, respectively, of FIG. 3.

Below the flange 24, the anchor 22 has depending tangs 31,31 which extend from the flange 24 downwardly and are adapted to be inserted through the opening 14 in the boat structure 13. As shown in FIG. 6, the tangs 31,31 are spaced apart to accommodate the wedge member 23 as it is driven therebetween. As shown in FIG. 2, the wedge member 23 comprises a head 35, a shank 36 and a tip 37. The head 35 is generally cylindrical in shape and conforms to and fits within the opening 27 in the button 25. The shank 36 is also circular but of smaller diameter than the head so as to fit between the tangs 31. The tip 37 is generally flattened to slide between the tangs 31 and is of smaller dimension than the shank 36 so that the expanding width of the wedge member between the tip 37 and the shank 36 provides a wedging action which facilitates the entry of the shank 36 between the tangs 31.

In installation of the male fastener member 11 into the structure 13, the tangs are pressed into the opening 14 so that the lower surface of the flange 24 bears against the upper surface of the structure 13. The material of the anchor 11 is resilient and is self-lubricating so as to enable the tangs to be forcibly inserted into the opening 14. The wedge element 23 is then driven into the opening 27 of the button until the head 35 of the wedge element fits entirely within the opening 27. As the wedge element is driven into the opening, the tip 37 of the wedge element enters between the tangs 31,31, and the enlarging portion between the tip portion 37 and the shank 36 causes the tangs 31 to spread and interlock with the structural member 13.

Figure 5:
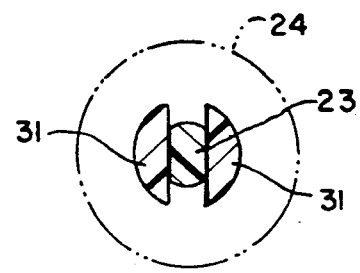

As shown in FIG. 5, the tangs 31 are crescent-shaped having rounded outer perimeters with flat confronting faces. The material is a synthetic polymeric resin, preferably a moldable acetal resin, such as DELRIN ® supplied by E. I. dupont.

The depth of the head 35 is equal to or less than the depth of the interior opening 27, so that when installing the anchor 22, the wedge member may be driven into the space between the tangs 31 and the head 35 will seat against the bottom of the opening and will not project above the enlarged upper end of the flared wall 26. When properly seated, the head does not interfere with the operations of engaging and disengaging the snap member 10 with the male fastener 11. By providing a head corresponding in depth with the interior opening, a firm support for the flared wall 26 is provided when the fastener 11 is properly installed.

The synthetic resin material is tough and resilient and has its own natural lubricating properties which facilitate the intercooperation of the flared wall of the button 25 with the spring ring 19. Thus, as the snap element 10 is pressed onto the button, the rounded upper edge of the flared wall 26 expands the spring ring 19 to cause the enlarged end of the flared wall to pass through the ring member. Further travel of the snap element causes the ring member 19 to engage on the reduced-diameter part of the wall 26 so that the ring retains the female snap member in place. The self-lubricating properties of the resin material also facilitates removal of the female member. For these reasons, the fasteners of the present invention are also suitable for use as original equipment. Because of the ability to form the resin in various colors, the fastener may be used as an ornamental design element in the structure where it is mounted. In aluminum structures, the use of the acetal resin avoids corrosion which is accelerated by conventional fasteners which may generate galvanic corrosion between the dissimilar metals.

The medial flange of the male member enables the male member to be inserted into the opening formed when the conventional steel male snap member is pulled out of the structure 13, necessitating replacement. The flange 24 cooperates with the tangs 31 of the anchor portion 22 to firmly anchor the male member in place in the same location as the steel member which it replaces. In this way, the replacement male member may cooperate with the existing female snap member in the canvas cover without requiring relocation of the female snap member and assuring a proper anchoring of the cover element by the snap fastener.

When replacing snap fasteners which damage the structure when they are pulled out of the structure, it is preferable to assure a clean opening 14 to provide a tight fit of the replacement male fastener in the structure. This is accomplished by simply drilling through the damaged hole with a drill bit which is selected to provide the proper sized opening in the material of the structure 13 corresponding to the diameter of the anchor portion 22 below the flange.

The acetal resin material of the replacement fastener also facilitates removal of the replacement fastener if it should become damaged or worn. The acetal material of the replacement fastener is subject to drilling and it is a simple procedure to drill through the center of the fastener to free the wedge member and permit withdrawal of the defective fastener and replacement with a fresh fastener.

While a particular embodiment of the present invention has been herein illustrated and described, it is not intended to limit the invention to such disclosure but changes and modifications may be made therein and thereto within the scope of the following claims.

What is claimed is:

1. For anchoring a movable component to a base structure, in combination with at least one female snap member comprising a cylindrical socket having an open end with a circumferential spring ring within the socket at the open and, said spring ring being formed of spring metal with a split affording expansion and contraction of the ring, a male fastener having a bottom with a flared wall operable to fit into the open end of said socket, said male and female members constituting a snap fastener, the larger end of the flared wall operable to expand said spring ring within said socket as the male member is inserted into said female socket, and to afford contraction of said ring to encircle the smaller end of the flared wall upon passage of the large end past said ring, the improvement wherein:

said male member is formed of a non-metallic material having a hardness sufficient to effect expansion of said spring ring and friction characteristics to afford passage of said larger end past said ring, and having a flange extending outwardly from said flared wall at its smaller end to lie flush against the surface of said base structure, said including means to firmly anchor said flange on the base structure comprising a plurality of tangs projecting from said flange in a direction opposite to said flared wall to penetrate said base structure, and a wedge element operable to be driven between said tangs to displace said tangs to interlock with the base and firmly anchor the flange to the base structure, said wedge element comprising an enlarged head, a shank and a narrow tip, said shank, when driven between said tangs being positioned between said tangs to firmly anchor said flange.

2. A combination according to claim 1 wherein said non-metallic material consists of a tough and resilient synthetic resin having its own natural lubricating properties to facilitate interengagement of said male and female members.

3. A combination according to claim 1 wherein said button is hollow to provide an opening for receiving said wedge element, said tangs comprising at least two crescent-shaped tangs spaced apart to provide a passage communicating with said opening and operable to receive said wedge element when it is inserted into and passes through said opening, said wedge element head conforming with said hollow opening and being sized to fit within said opening when the wedge element is fully displaced into said opening, said shank operable to resiliently spread said tangs to anchor said flange on the base structure.

4. For use in a boat, a replacement male fastening member for anchoring canvas components having at least one female snap member having a cylindrical socket with a circumferential spring wall adjacent the bottom of the socket operable to cooperate with the male snap member, said male and female members comprising a snap fastener, said male fastener member having a button with a flared wall operable to fit into the open end of the socket, said button having a larger end on the flared wall operable to expand said spring ring within said socket as the button is inserted into said socket, and a smaller end to afford contraction of said ring to encircle the flared wall at the smaller end upon passage of the large end past said ring, said male member being formed of a non-metallic material having a hardness sufficient to effect expansion of said spring ring and friction characteristics to afford passage of said larger end past said ring, and having a flange extending outwardly from said flared wall at its smaller end to lie flush against the surface of said base, and including means to firmly anchor said flange on the base comprising a plurality of tangs projecting from said flange in a direction opposite to the projection of said flared wall to penetrate said base, and a wedge element operable to be driven between said tangs to displace said tangs to interlock with the base and firmly anchor the flange to the base, said wedge element comprising an enlarged head, a shank and a narrow tip, said shank, when the wedge element is fully driven between said into said opening, being positioned between said tangs.

5. A replacement member according to claim 4 wherein said non-metallic material consists of a tough and resilient synthetic resin having its own natural lubricating properties to facilitate interengagement of said male and female members.

6. A replacement member according to claim 4 wherein said button is hollow to provide an opening for receiving said wedge element, said tangs comprising at least two crescent-shaped resilient tangs spaced apart to provide a passage communicating with said opening and operable to receive said wedge element when it is inserted into and passes through said opening, said wedge element head conforming with said hollow opening, and being sized to fit within said opening, said shank operable to resiliently spread said tangs to anchor said flange on the base structure.

* * * * *

UNITED STATES PATENT AND TRADEMARK OFFICE
CERTIFICATE OF CORRECTION

PATENT NO. : 5,175,911

DATED : January 5, 1993

INVENTOR(S) : Joseph L. Terrels and CHristopher J. Terrels

It is certified that error appears in the above-identified patent and that said Letters Patent is hereby corrected as shown below:

Column 1, line 34, "body st" should be --body structure--;

Column 2, line 6, "male snap member 1" should be --male snap member 11--

Column 4, line 33, "said" (first occurrence) should be --and--.

Signed and Sealed this

Second Day of November, 1993

Attest:

BRUCE LEHMAN

Attesting Officer

Commissioner of Patents and Trademarks